(12) United States Patent
Park et al.

(10) Patent No.: US 6,275,451 B1
(45) Date of Patent: Aug. 14, 2001

(54) INFORMATION RECORDING APPARATUS AND INFORMATION REPRODUCING APPARATUS

(75) Inventors: Youngju Park; Jiro Endo; Takayoshi Noguchi; Takahiro Horiuchi, all of Tokorozawa (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/233,242

(22) Filed: Jan. 19, 1999

(30) Foreign Application Priority Data

Jan. 22, 1998 (JP) .................................... 10-010856

(51) Int. Cl.$^7$ .............................. G11B 17/22; H04N 5/91
(52) U.S. Cl. .......................... 369/32; 369/47.15; 386/106; 386/95
(58) Field of Search ..................................... 369/32, 47.15, 369/53.11, 30, 33, 53.2; 386/95, 125, 70, 106, 111, 126, 51, 112

(56) References Cited

U.S. PATENT DOCUMENTS 5,701,385 * 12/1997 Katsuyama et al. .................. 386/106
5,923,627 * 7/1999 Miwa et al. ............................ 369/47
6,067,400 * 5/2000 Saeki et al. ............................ 386/95

* cited by examiner

Primary Examiner—Ali Neyzari
(74) Attorney, Agent, or Firm—Pitney, Hardin, Kipp & Szuch LLP

(57) ABSTRACT

An information recording apparatus records information including a plurality of information groups onto a recording medium. Each of the plurality of information groups includes a plurality of images. The apparatus has: a first recording device for recording the plurality of images onto the recording medium for each of the plurality of information groups; an reproduction device for reproducing the plurality of images for each of the plurality of the information groups, while the first recording device is recording the plurality of images onto the recording medium; a selection device for selecting one image from the plurality of images reproduced by the reproduction device as an identification image for identifying one of the plurality of information group in which the selected one image is included, while the first recording device is recording the plurality of images onto the recording medium; and a second recording device for recording at least either one of the identification image and information designating the identification image onto the recording medium.

8 Claims, 12 Drawing Sheets

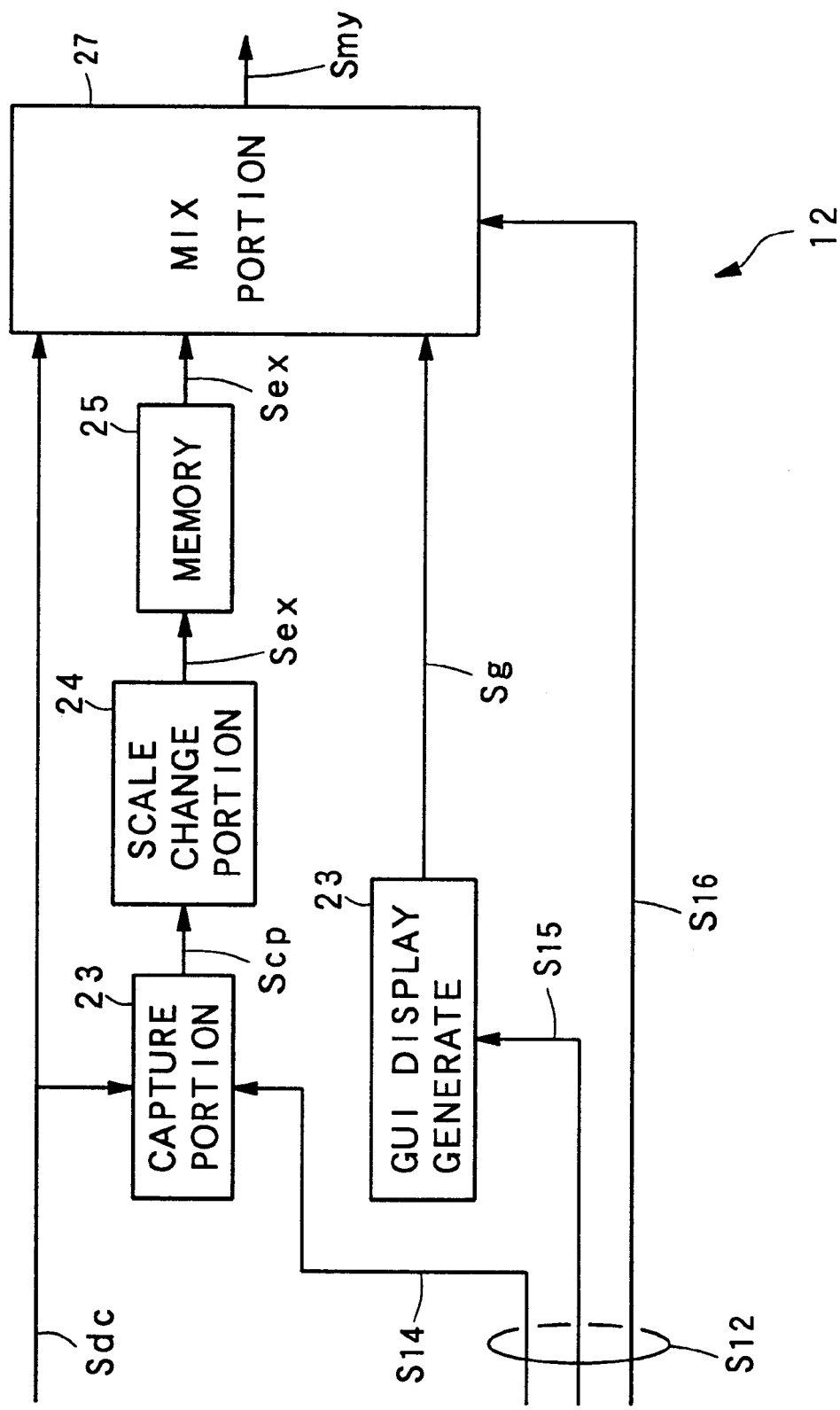

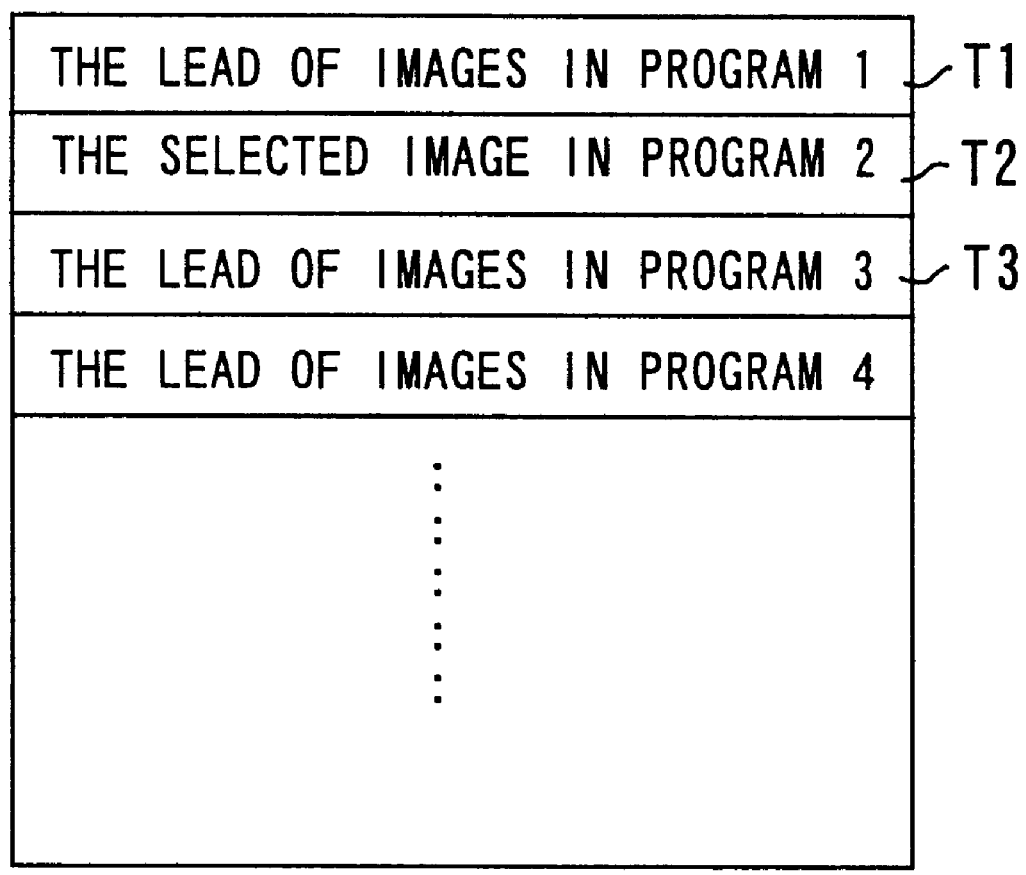

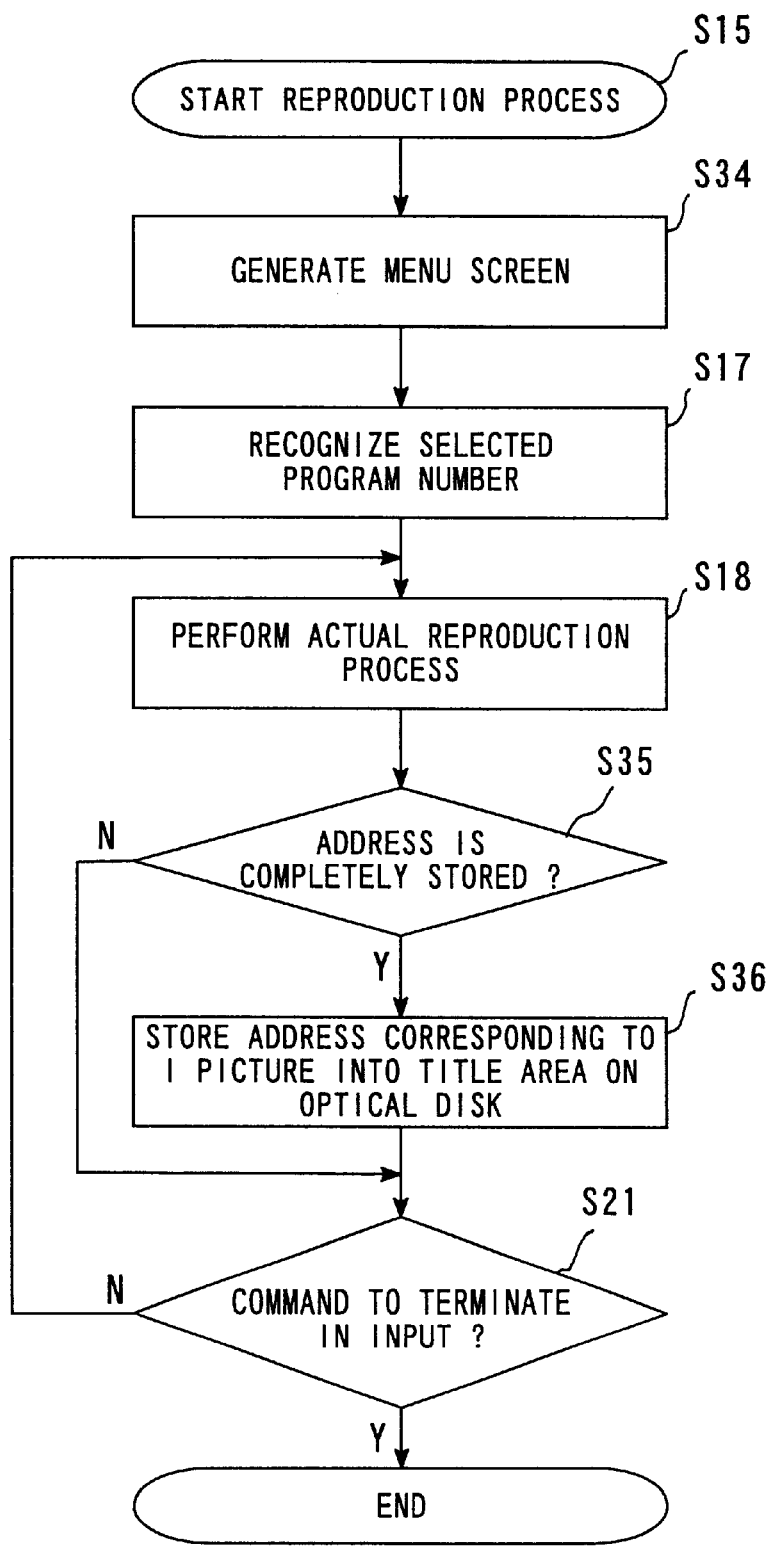

INFORMATION RECORDING APPARATUS AND INFORMATION REPRODUCING APPARATUS

BACKGROUND OF THE INVENTION

1. Field of the Invention

The present invention relates to an information recording apparatus for recording information on a recording medium and an information reproducing apparatus for reproducing information recorded on the recording medium, more particularly, to an information recording apparatus and a information reproducing apparatus, capable of displaying a menu screen indicating a plurality of image information recorded on the recording medium.

2. Description of the Related Art

When a plurality of information (such as image information) are read out and reproduced from a recording medium in which they are recorded, a menu screen showing the information can be used conveniently.

For example, if a plurality of picture images are recorded on a recording medium, a menu screen is produced with the information for identifying each picture image, such as titles and still images taken out from the picture images so that the menu screen can be displayed on a monitor before actually reproducing the picture images. Accordingly, a desired picture image can be chosen easily from the plurality of picture images recorded on the recording medium.

In particular, by displaying a still image taken out from each picture image on the menu screen, the content of each picture image can be shown further specifically, and thus the picture image can be chosen more easily. This kind of technique is known.

However, it involves a problem in that it is not easy to choose a still image capable of specifically showing the content of the picture because the image which can most appropriately show the content of the picture image differs from person to person.

SUMMARY OF THE INVENTION

It is therefore a first object of the present invention to provide an information recording apparatus in which an image for identifying information recorded on a recording medium can be selected and set freely by the user.

A second object of the present invention is to provide an image reproducing apparatus in which the menu screen can be changed freely by the user.

The above-mentioned object can be achieved by an information recording apparatus according to the present invention. The information recording apparatus records information including a plurality of information groups onto a recording medium. Each of the plurality of information groups includes a plurality of images. The information recording apparatus has: a first recording device for recording the plurality of images onto the recording medium for each of the plurality of information groups; an reproduction device for reproducing the plurality of images for each of the plurality of the information groups, while the first recording device is recording the plurality of images onto the recording medium; a selection device for selecting one image from the plurality of images reproduced by the reproduction device as an identification image for identifying one of the plurality of information group in which the selected one image is included, while the first recording device is recording the plurality of images onto the recording medium; and a second recording device for recording at least either one of the identification image and information designating the identification image onto the recording medium.

The information recording apparatus can reproduce the plurality of images, while recording these images onto the recording medium. The user can view the reproduced images, while the information recording apparatus is recording the images onto the recording medium. Therefore, the user can select one desired image from the reproduced images. When the user find a desired image, the user manipulates the information recording apparatus, for example. In response to this, the selection device selects one image from reproduced images as an identification image for identifying one of the plurality of information group in which the selected one image is included. Then, the second recording device records at least either one of the identification image and information designating the identification image onto the recording medium. Thus, the user can freely selects an image for identifying information, while the information recording apparatus is recording the information onto the recording medium.

It is preferable that the recording domain and the identification domain are separately formed on the recording medium. The plurality of images are recorded into the recording domain. The identification image or information designating the identification image is recorded into the identification domain. Therefore, it is easy to discriminate between the identification image and the plurality of images, for example, when an information reproducing apparatus reproduces the plurality of image or the identification image.

Furthermore, the selection device may includes: an accepting device for accepting an input of an instruction; and an image selecting device for selecting one image that is reproduced at a time closest to a time that the accepting device accepts the input of the instruction. Therefore, the user can select a desired image as an identification image in a real time.

The above-mentioned object can be also achieved by an information reproducing apparatus according to the present invention. The information reproducing apparatus reproduces information including a plurality of information groups from a recording medium on which the information is recorded. Each of the plurality of information groups includes a plurality of images. The information reproducing apparatus has: a reproduction device for reproducing the plurality of image from the recording medium for each of the plurality of information groups; a selection device for selecting one image from the plurality of images reproduced by the reproduction device as an identification image for identifying one of the plurality of information group in which the selected one image is included, while the reproduction device is reproducing the plurality of images from the recording medium; a recording device for recording at least either one of the identification image and information designating the identification image onto the recording medium; and a menu screen producing device for producing and displaying a menu screen including the identifying image recorded on the recording medium by the recording device.

While the information recording apparatus is reproducing the images from the recording medium, the user can select one desired image from the reproduced images by viewing the reproduced images. When the user find a desired image, the user manipulates the information reproducing apparatus, for example. In response to this, the selection device selects one image from reproduced images as an identification image for identifying one of the plurality of information group in which the selected one image is included. Then, the recording device records at least either one of the identification image and information designating the identification image onto the recording medium. Thus, the user can freely selects an image for identifying information, while the information reproducing apparatus is reproducing the information from the recording medium. Furthermore, the menu screen producing device uses the identification image recorded on the recording medium, when producing the menu screen.

It is preferable that the recording domain and the identification domain are separately formed on the recording medium. In this case, the identification image or information designating the identification image is recorded into the identification domain. Therefore, it is easy to discriminate between the identification image and the plurality of images, when an information reproducing apparatus reproduces the plurality of image, or when an information reproducing apparatus uses the identification image to produce the menu screen.

Furthermore, the selection device may includes: an accepting device for accepting an input of an instruction; and an image selecting device for selecting one image that is reproduced at a time closest to a time that the accepting device accepts the input of the instruction. Therefore, the user can select a desired image as an identification image in a real time.

Moreover, the menu screen producing device may produce and display the menu screen on which the identification images respectively identifying the plurality of information groups are arranged. Moreover, the information reproducing apparatus further has an identification image selection device for selecting one identification image from the identification images arranged in the menu screen. In this case, the reproduction device reproduces the plurality of images included in one of the plurality of information groups that is identified by the selected one identification image.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a block diagram showing a configuration of a menu screen producing circuit of the information recording and reproducing apparatus of the first embodiment;

FIG. 6C is a diagram showing the title domain on the optical disk according to the first embodiment;

FIG. 8 is a flowchart showing a reproduction process according to the second embodiment.

DETAILED DESCRIPTION OF THE PREFERRED EMBODIMENTS

Referring to the accompanying drawings, embodiments of the present invention will be described. In the description set forth hereinafter, the present invention is embodied in an information recording and reproducing apparatus for recording and reproducing information recorded on an optical disk. Examples of the optical disk include an CD-R (Compact Disk-Recordable), DVD-R (DVD-Recordable), and the other kinds of optical disks capable of rewriting the information for one or plural times.

(1) First Embodiment

A first embodiment of the present invention will be explained.

An information recording and reproducing apparatus according to the first embodiment of the present invention mainly has a function of recording information including a plurality of images such as picture images (motion pictures) on an optical disk. The information may include sounds in addition to the plurality of the images. Furthermore, the information recording and reproducing apparatus has a function of reading and reproducing the information including a plurality of images from an optical disk.

Information is divided into a plurality of groups. That is, the information is recorded on the optical disk per group. Hereinafter the group will be referred to as a "program". The program is a unit for the user to distinguish the information. For example, each program corresponds to each picture image.

When recording information onto an optical disk, the information recording and reproducing apparatus records the information onto the optical disk after allotting different program numbers to the respective programs included in the information.

Furthermore, when reproducing the information recorded on an optical disk, the user designates the program number corresponding to the desired program. The information recording and reproducing apparatus reads out and reproduces the program corresponding to the program number designated by the user.

Figure 1A:
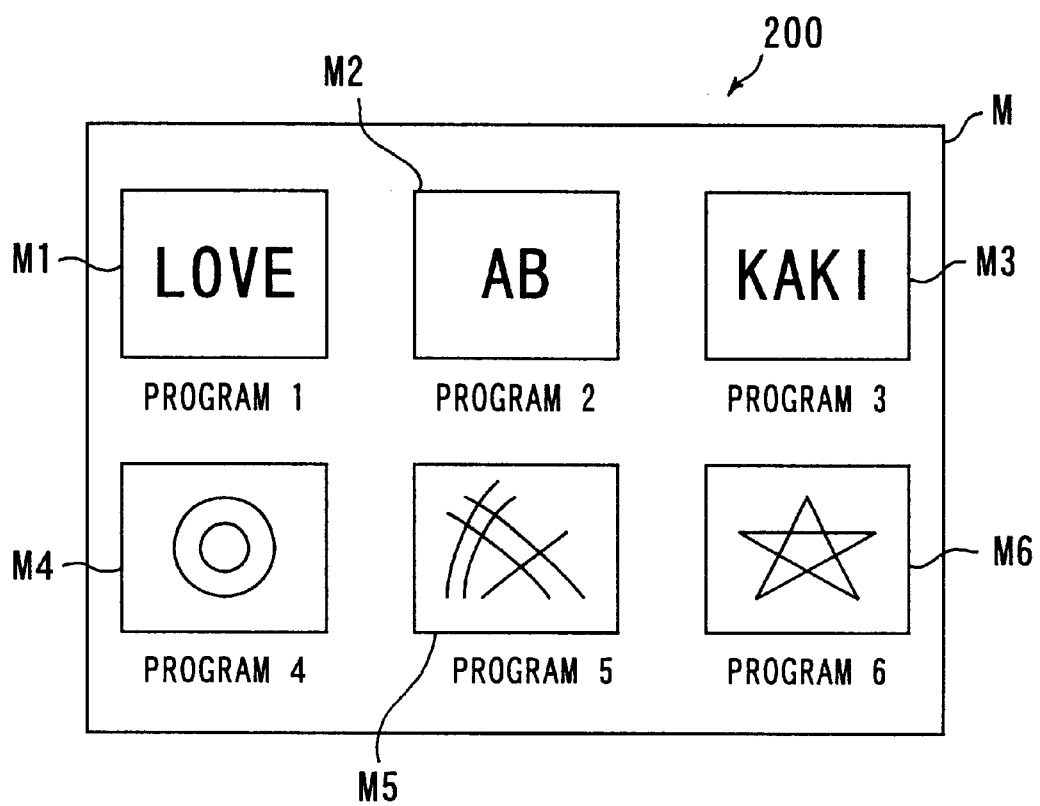
FIG. 1A is a diagram showing a menu screen of an information recording and reproducing apparatus of a first embodiment of the present invention.

Moreover, when reproducing the information recorded on the optical disk, the information recording and reproducing apparatus displays a menu screen M on a monitor 200 as shown in FIG. 1A. Reduced still images for identifying a plurality of programs recorded on the optical disk are arranged in the menu screen M. The user can choose the program to be reproduced by viewing the still images.

Figure 1B:
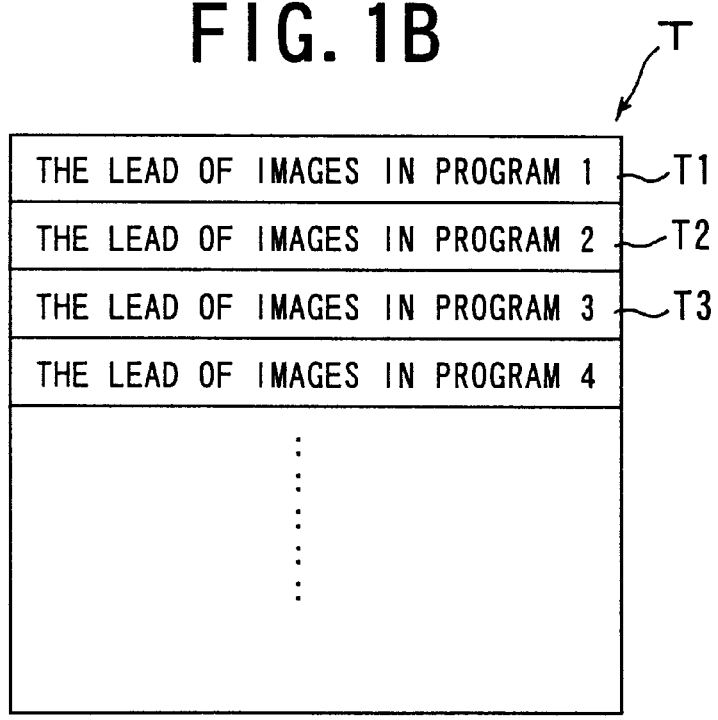
FIG. 1B is a diagram showing a content of a title domain formed on an optical disk according to the first embodiment.

In order to allow the display of such a menu screen M, a title domain T for recording the still images constituting the menu screen M is formed on the optical disk in addition to a recording domain for recording the information such as picture images. FIG. 1B schematically shows the title domain T of an optical disk. When displaying the menu screen M, the information recording and reproducing apparatus reads out the still images recorded in the title domain T.

Figure 2:
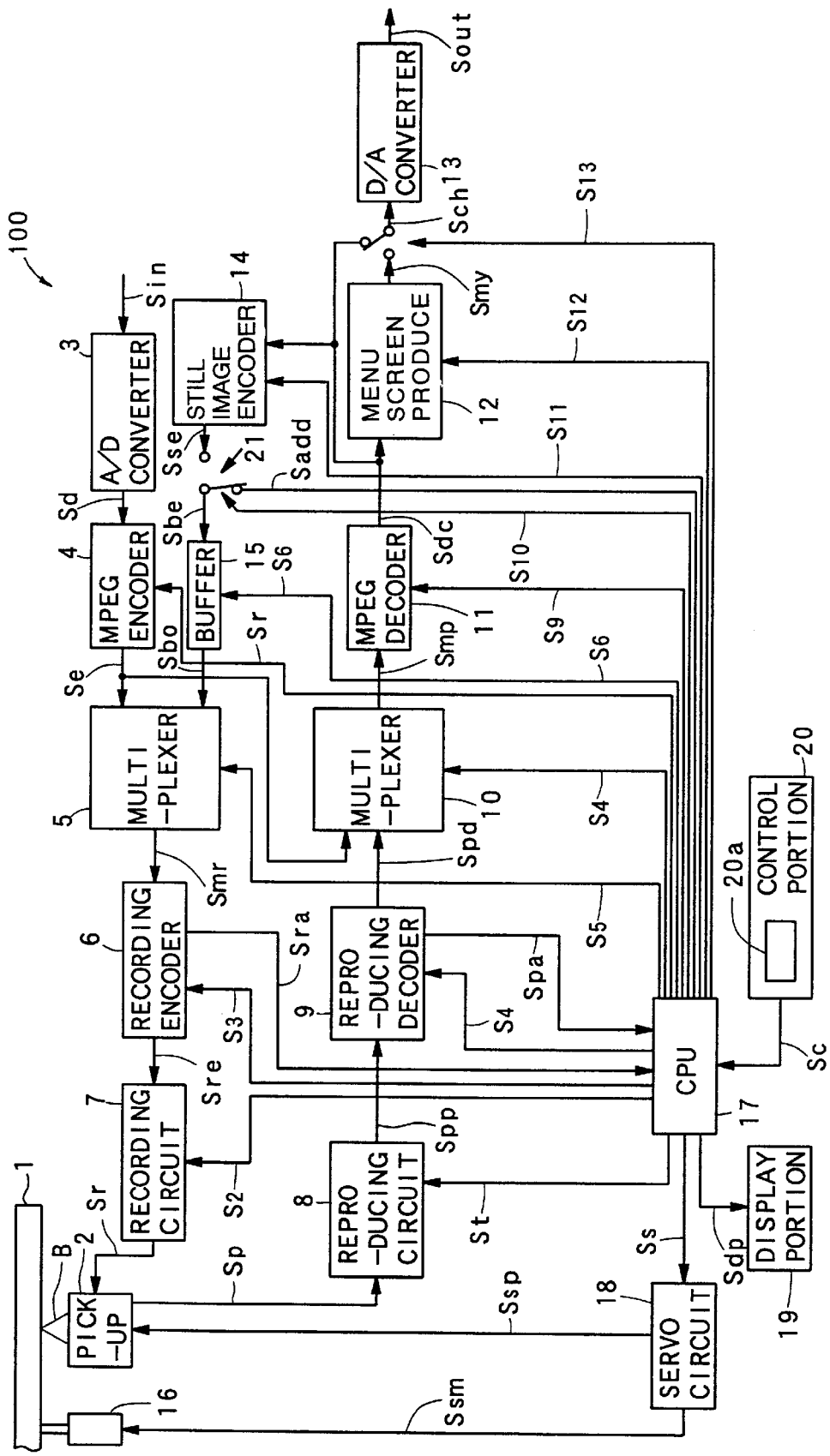
FIG. 2 is a block diagram showing a configuration of the information recording and reproducing apparatus of the first embodiment.

FIGS. 2 and 3 show the configuration of the information recording and reproducing apparatus according to the first embodiment.

As shown in FIG. 2, an information recording and reproducing apparatus 100 according to the first embodiment has a pickup 2, an A/D (analog to digital) converter 3, an MPEG (Moving Picture Coding Expert Group) Encoder 4, a multiplexer 5, a recording encoder 6, a recording circuit 7, a reproducing circuit 8, a reproducing decoder 9, a multiplexer 10, an MPEG decoder 11, a menu screen producing circuit 12, a D/A converter 13, a still image encoder 14, a buffer 15, a spindle motor 16, a CPU 17, a servo circuit 18, a display portion 19, an control portion 20 and switches 21, 22.

The control portion 20 includes a screen selecting button 20a. The screen selecting button 20a, as later described, is used for selecting the still image for showing a program on the menu screen M.

As shown in FIG. 3, the menu screen producing circuit 12 comprises a capture portion 23, a scale change portion 24, a memory 25, a GUI (Graphical Users Interface) display generating portion 26, and a mix portion 27.

When recording information input from an external source onto an optical disk 1, the information recording and reproducing apparatus 100 performs a recording operation as follows. The information input from the external source includes image information and sound information.

In FIG. 2, the information to be recorded on the optical disk 1 is input as an information signal $S_{in}$ from the external source. When the information signal $S_{in}$ is input, the A/D converter 3 generates a digital signal $S_d$ by digitizing the information signal $S_{in}$, and then outputs this signal to the MPEG encoder 4.

The MPEG encoder 4 compresses the digital signal $S_d$ by the MPEG 2 method according to a control signal $S_7$ output from the CPU 17 so as to generate a compression signal $S_e$. Then, the MPEG encoder 4 outputs the compression signal $S_e$ to the multiplexers 5 and 10.

The multiplexer 5 switches the compression signal $S_e$ and a buffer signal $S_{bo}$ (later described) according to the control signal $S_5$ output from the CPU 17. The signal output from the multiplexer 5 is supplied to the recording encoder 6 as the switching recording signal $S_{mr}$.

The recording encoder 6 applies the formatting process to the switching recording signal Smr according to the control signal $S_3$ output from the CPU 17. The formatting process is a process of converting the format of the switching recording signal $S_{mr}$ to the format for recording on the optical disk 1. The signal generated by the recording encoder 6 is output to the recording circuit 7 as the recording encode signal $S_{re}$.

Furthermore, the recording encoder 6 generates a recording address signal $S_{ra}$ for showing the recording position of the recording signal $S_r$ (later described) on the optical disk 1, according to the above-mentioned control signal $S_3$, and then outputs the recording address signal $S_{ra}$ to the CPU 17.

The recording circuit 7 converts the recording encode signal $S_{re}$ to the recording signal $S_r$ for recording, according to the control signal $S_2$ output from the CPU 17, and then outputs to the pickup 2. At the time, the recording circuit 7 applies the write strategy process, and the like, to the recording encode signal $S_{re}$ to form a pit with the shape accurately on the optical disk 1 corresponding to the information to be recorded.

The pickup 2 drives a light source (not illustrated) such as a semiconductor laser provided in the pickup 2, based on the recording signal $S_r$ in order to generat a light beam B corresponding to the recording signal $S_r$, such as a laser light beam. The light beam B is output from the pickup 2 to the information recording surface of the optical disk 1. Accordingly, a pit corresponding to the recording signal $S_r$ is formed on the information recording surface by, for example, the phase change memory method. Accordingly, the recording signal $S_r$ is recorded on the optical disk 1. While such a recording operation is performed, the optical disk 1 is rotated at a predetermined rotation frequency by the spindle motor 16 driven based on the spindle control signal $S_{sm}$.

On the other hand, the compression signal $S_e$ output form the MPEG encoder 4 passes through the multiplexer 10, and it is supplied to the MPEG decoder 11 as the reproduction switching signal $S_{mp}$.

The MPEG decoder 11 applies the expanding process to the reproduction switching signal $S_{mp}$ (this is the signal the same as the compression signal $S_e$ in recording the information) by the MPEG 2 method, according to the control signal $S_9$ output from the CPU 17. The signal output from the MPEG decoder 11 is supplied to the menu screen producing circuit 12, the still image encoder 14 and one of the input terminals of the switch 22 as the decode signal $S_{dc}$.

The still image encoder 14 chooses one image from the image information included in the decode signal $S_{dc}$ according to the control signal $S_{11}$ output from the CPU 17 so as to encode the image as the still image. The signal corresponding to this image is supplied to one of the input terminals of the switch 21 from the still image encoder 14 as the still image encode signal $S_{se}$.

The switch 21 switches the still image encode signal $S_{se}$ and the address information signal $S_{add}$ output from the CPU 17, according to the control signal $S_{10}$ output from the CPU 17. As a result, either one of the still image encode signal $S_{se}$ and the address information signal $S_{add}$ is output from the output terminal to the switch 21 to the buffer 15 as the switching signal $S_{be}$.

The buffer 15 temporarily stores the switching signal $S_{be}$ according to the control signal $S_8$ output from the CPU 17. The switching signal $S_{be}$ in the buffer 15 is output to the multiplexer 5 as the buffer signal $S_{bo}$.

On the other hand, in the recording operation, the switch 22 is switched to the decode signal $S_{dc}$ side according to the control signal $S_{13}$ output from the CPU 17. As a result, the decode signal $S_{dc}$ is output from the switch 22 to the D/A converter 13 as the switching signal $S_{ch}$.

The D/A converter 13 generates the output signal $S_{out}$ corresponding to the information signal $S_{in}$ by converting the switching signal $S_{ch}$ to an analog signal. The output signal $S_{out}$ is output to the monitor 200 or a speaker (not illustrated).

Accordingly, the information recording and reproducing apparatus 100 records information input from the external source on the optical disk 1 while reproducing (monitoring) an image or a sound included in the information. In recording the information, the menu screen producing circuit 12 does not function.

The reproduction operation of the information recording and reproducing apparatus 100 will be explained. When reproducing the information recorded on the optical disk 1, the information recording and reproducing apparatus 100 operates as follows.

The pickup 2 emits the light beam B to be used for reproduction to the rotating optical disk 1. Further, the pickup 2 receives the light beam reflected by the optical disk 1, and generates a detection signal $S_p$ corresponding to the pit formed on the optical disk 1, on the basis of the received light beam. Then, the pickup 2 outputs the detection signal $S_p$ to the reproducing circuit 8.

The reproducing circuit 8 amplifies the detection signal $S_p$ by a predetermined amplification ratio, according to the control signal $S_1$ output from the CPU 17, so as to shape the wave form of the detection signal $S_p$. As a result, the reproduction signal $S_{pp}$ is generated by the reproducing circuit 8. Then, the reproduction signal $S_{pp}$ is output to the reproducing decoder 9.

The reproducing decoder 9 applies the unformatting process to the reproduction signal $S_{pp}$ according to the control signal $S_4$ output from the CPU 17 so as to generate the reproduction decode signal $S_{pd}$. The unformatting process corresponds to the formatting process in the above-mentioned recording encoder 6. The reproduction decode signal $S_{pd}$ is output to the multiplexer 10.

At the same time, the reproducing decoder 9 generates a reproduction address signal $S_{pa}$ for indicating the position on the optical disk 1 where the reproduction signal $S_{pp}$ is recorded (that is, the position on the optical disk 1 where the reproduced information is recorded), according to the control signal $S_4$. Then, the reproducing decode 9 outputs the reproduction address signal $S_{pa}$ to the CPU 17.

The multiplexer 10 allows the passage of the reproduction decode signal $S_{pd}$ according to the control signal $S_6$ output from the CPU 17 so as to output the the reproduction decod signal $S_{pd}$ to the MPEG decoder 11 as a reproduction switching signal $S_{mp}$.

The MPEG decoder 11 applies the above-mentioned expanding process to the reproduction switching signal $S_{mp}$ according to the control signal $S_9$ output from the CPU 17 so as to generate a decode signal $S_{dc}$. The decode signal $S_{dc}$ is output to the menu screen producing circuit 12, the still image encoder 14 and one of the input terminals of the switch 22.

Then, the still image encoder 14, the switch 21 and the buffer 15 performe the above-mentioned operation on the decode signal $S_{dc}$. As a result, a buffer signal $S_{bo}$ is output from the buffer 15 to the multiplexer 5.

The multiplexer 5, the recording encoder 6, the recording circuit 7 and the pickup 2 record only the buffer signal $S_{bo}$ on the optical disk 1 by the process later described when the information is reproduced.

At this time, the pickup 2 generates the above-mentioned detection signal $S_p$ for reproducing the information recorded on the optical disk 1. Therefore, the pickup 2 records the buffer signal $S_{bo}$ and reproduces the detection signal $S_p$ substantially simultaneously.

Concretely, the detection signal $S_p$ output from the pickup 2 is buffered at the stage before being input into the reproducing circuit 8, or in the reproducing circuit 8. When the rate of generating the detection signal $S_p$ by the pickup is higher than the rate of treating the buffered detection signal $S_p$ by the reproducing circuit 8, the pickup 2 is provided with the spare time. The pickup 2 records the buffer signal $S_{bo}$ on the optical disk 1 as the recording signal $S_r$, utilizing the spare time.

On the other hand, the menu screen producing circuit 12 generates the menu screen M according to the control signal $S_{12}$ output from the CPU 17. Concretely, the menu screen producing circuit 12 select the image designated by the control signal $S_{12}$, from the decode signal $S_{dc}$, and then generates the menu screen M by utilizing the selected image, and then outputs the signal for forming the menu screen M to the other input terminal of the switch 22 as the menu signal $S_{my}$.

The switch 22 switches the menu signal $S_{my}$ and the above-mentioned decode signal $S_{dc}$ according to the control signal $S_{13}$ output from the CPU 17. As a result, the menu signal $S_{my}$ and the decode signal $S_{dc}$ are selectively output from the output terminal of the switch 22. Then, the signal output from the output terminal of the switch 22 is supplied to the D/A converter 13 as the switching signal $S_{ch}$.

The D/A converter 13 converts the switching signal $S_{ch}$ to the analog signal so as to generate the output signal $S_{out}$ including the menu screen M corresponding to the information signal $S_{in}$ or the menu signal $S_{my}$. Then, the output signal $S_{out}$ is output to the monitor (later described) or a speaker (not illustrated).

During the above-mentioned recording operation or reproduction operation, the CPU 17 generates the control signals $S_1$ to $S_{13}$ based on the recording address signal $S_{ra}$ or the reproduction address signal $S_{pa}$, and outputs the generated signal. By the operation of the above-mentioned devices and circuits according to the control signals, the main recording process, the interruption process, and the reproduction process later described can be realized.

The control portion 20 comprises a stop key, a recording key, a reproduction key and a hold key, and the like, in addition to the above-mentioned screen selecting button 20a. If the user operates these buttons or keys, the control portion 20 generates the instruction signal $S_c$ according thereto, and outputs it to the CPU 17. The CPU 17 generates and outputs the control signals S1 to $S_{13}$ according to the instruction signal Sc.

In parallel therewith, the CPU 17 generates a control signal $S_s$ for controlling the spindle motor 16 and the pickup 2, and outputs it to the servo circuit 18. The servo circuit 18 generates a spindle control signal $S_{sm}$ for controlling the rotation of the spindle motor 16 according to the control signal $S_s$, and outputs it to the spindle motor 16. Furthermore, the servo circuit 18 generates a pickup control signal $S_{sp}$ to be used for the tracking servo control and the focus servo control in the pickup 2, and outputs it to the pickup 2. Accordingly, the tracking servo control and the focus servo control are carried out, based on the pickup control signal $S_{sp}$, when the recording signal $S_r$ is recorded or the detection signal $S_p$ is detected by the pickup 2. As a result, the irradiation position or the focus position of the light beam B is controlled.

Moreover, the information necessary for the user to operate the information recording and reproducing apparatus 100 is displayed on the display portion 19. The displaying process is carried out, based on the display signal $S_{dp}$ from the CPU 17.

The operation of the menu screen producing circuit 12 will be explained. When the information recording and reproducing apparatus 100 reproduces the information recorded on the optical disk 1, the menu screen producing circuit 12 operates as follows.

As shown in FIG. 3, the capture portion 23 in the menu screen producing circuit 12 temporarily stores the signal corresponding to the image which is to be used for forming the menu screen M and which is selected from the decode signal $S_{dc}$, according to the control signal $S_{14}$ included in the above-mentioned control signal $S_{12}$ output from the CPU 17. Then, the capture portion 23 outputs the stored signal to the scale change portion 24 as the capture signal $S_{cp}$, according to the control signal $S_{14}$.

The scale change portion 24 changes the size of the image included in the capture signal $S_{cp}$ by the reduction scale necessary for forming the menu screen M, according to the control signal $S_{15}$ included in the above-mentioned control signal $S_{12}$. Then, the signal generate by the scale-down process is output to the memory 25 as the reduction scale signal $S_{ex}$.

The memory 25 temporarily stores the reduction scale signal $S_{ex}$, and then outputs this signal to the mix portion 27.

On the other hand, the GUI display generating portion 26 generates the image (that is, icons, buttons, and the like)

necessary for forming the menu screen M other than the image included in the reduction scale signal $S_{ex}$, according to the control signal $S_{15}$ included in the above-mentioned control signal $S_{12}$. The signal generated by this process is output to the mix portion 27 as the image signal $S_g$.

The mix portion 27 generates the menu screen M, using the above-mentioned reduction scale signal $S_{ex}$, image signal $S_g$ and decode signal $S_{dc}$ according to the control signal $S_{16}$ included in the control signal $S_{12}$. The mix portion 27 outputs the menu signal $S_{my}$ to the switch 22 as the final signal for forming the menu screen M.

The recording process of the information recording and reproducing apparatus 100 will be explained. The recording process explained below is carried out whenever a program is recorded on the optical disk 1.

Furthermore, in the first embodiment, the switch 21 is always switched to the still image encode signal $S_{se}$ side.

The recording process comprises the main recording process and the interruption process.

Figure 4A:
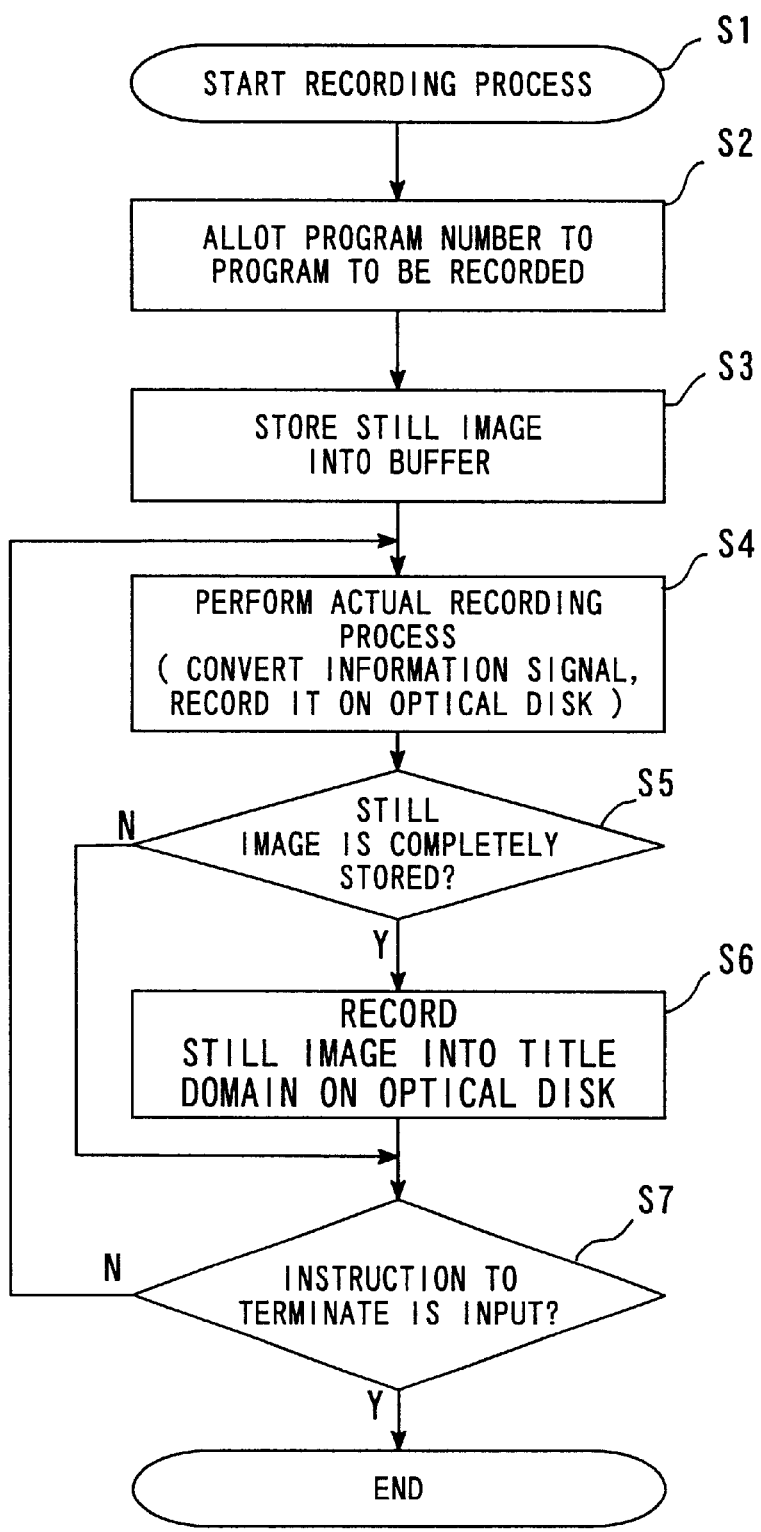
FIG. 4A is a flowchart showing a recording process according to the first embodiment.

Firstly, the main recording process will be explained with reference to FIG. 4A. In FIG. 4A, when the main recording process is commenced (step 1), the information recording and reproducing apparatus 100 allots a program number to the information (i.e. program) to be recorded (step 2). The allocation of the program number may be carried out, according to the input by the user. In this case, the user inputs a program number into the information recording and reproducing apparatus 100 by operating the control portion 20, and the CPU 17 of the information recording and reproducing apparatus 100 recognizes the input program number. Alternatively, the CPU 17 may automatically apply a program number to the information to be recorded. In this case, the CPU 17 reads out the information related with the program already recorded on the optical disk 1 (such as each program number, name, address information indicating the recorded position on the optical disk 1, and the like) and chooses a number other than the already existing numbers for the program to be recorded.

Furthermore, a new title domain is formed (allocated) on the optical disk 1, following the program number allocation. The information corresponding to the still image for identifying the information to be recorded will be recorded in this title domain.

When the program number is allotted, the information recording and reproducing apparatus 100 receives the information signal $S_{in}$ corresponding to this program. Then, the A/D conversion process in the A/D converter 3 and the compression process in the MPEG encoder 4 are commenced by the control of the CPU 17 so as to start recording the information signal Sin on the optical disk 1.

The I picture at the lead of the information signal $S_{in}$ corresponding to this program is next input to the MPEG decoder 11 from the MPEG encoder 4 via the multiplexer 10. The I picture is then expanded by the MPEG decoder and encoded by the still image encoder 14. Accordingly, a still image corresponding to the I picture is formed and the still image is output to the buffer 15 via the switch 21. That is, the switching signal $S_{be}$ supplied from the switch 21 to the buffer 15 is an image signal for forming the still image. The still image (switching signal $S_{be}$) is temporarily stored in the buffer 15 (step 3). The "I picture" is the abbreviation of the "Intra-picture", which is an image information piece capable of forming one complete image independently in the MPEG 2 method image compression process.

At the same time, the information signal $S_{in}$ input into the information recording and reproducing apparatus 100 is converted to a recording signal $S_r$ in the process of passing through the A/D converter 3, the MPEG encoder 4, the multiplexer 5, the recording encoder 6 and the recording circuit 7, and recorded on the optical disk 1 by the pickup 2 (step 4).

Then, whether or not the above-mentioned still image (switching signal $S_{be}$) is completely stored in the buffer 15 is determined (step 5), and if not so, the process proceeds to the step 7.

On the other hand, if the still image is completely stored in the buffer 15, the still image stored in the buffer 15, that is, the I picture is recorded in the title domain on the optical disk 1 (step 6). Concretely, the buffer signal $S_{bo}$ is recorded in the title domain by the pickup 2 via the multiplexer 5, the recording encoder 6 and the recording circuit 7.

Then, whether or not the instruction for terminating the main recording process is input is determined in the control portion 20 (step 7). When the instruction for the termination is input by the user, the main recording process is ended. On the other hand, when the instruction for the termination is not input, the process returns to the step 4.

Accordingly, when a program is recorded on the optical disk 1 in the information recording and reproducing apparatus 100, the main recording process is carried out. Therefore, the program is recorded on the optical disk 1 and the I picture at the lead of the program is recorded in the title domain of the optical disk as the still image. When the optical disk 1 is reproduced next time, the still image is displayed on the menu screen M as the image for identifying the program. In the above-mentioned main recording process, the I picture at the lead of the program is forcibly selected as the initial image and recorded in the title domain.

The interruption process will be explained with reference to FIG. 4B. The interruption process is carried out while the above-mentioned main recording process is carried out. However, the interruption process can be carried out only from the step 4 to the step 6 in the main recording process shown in FIG. 4A.

Figure 4B:
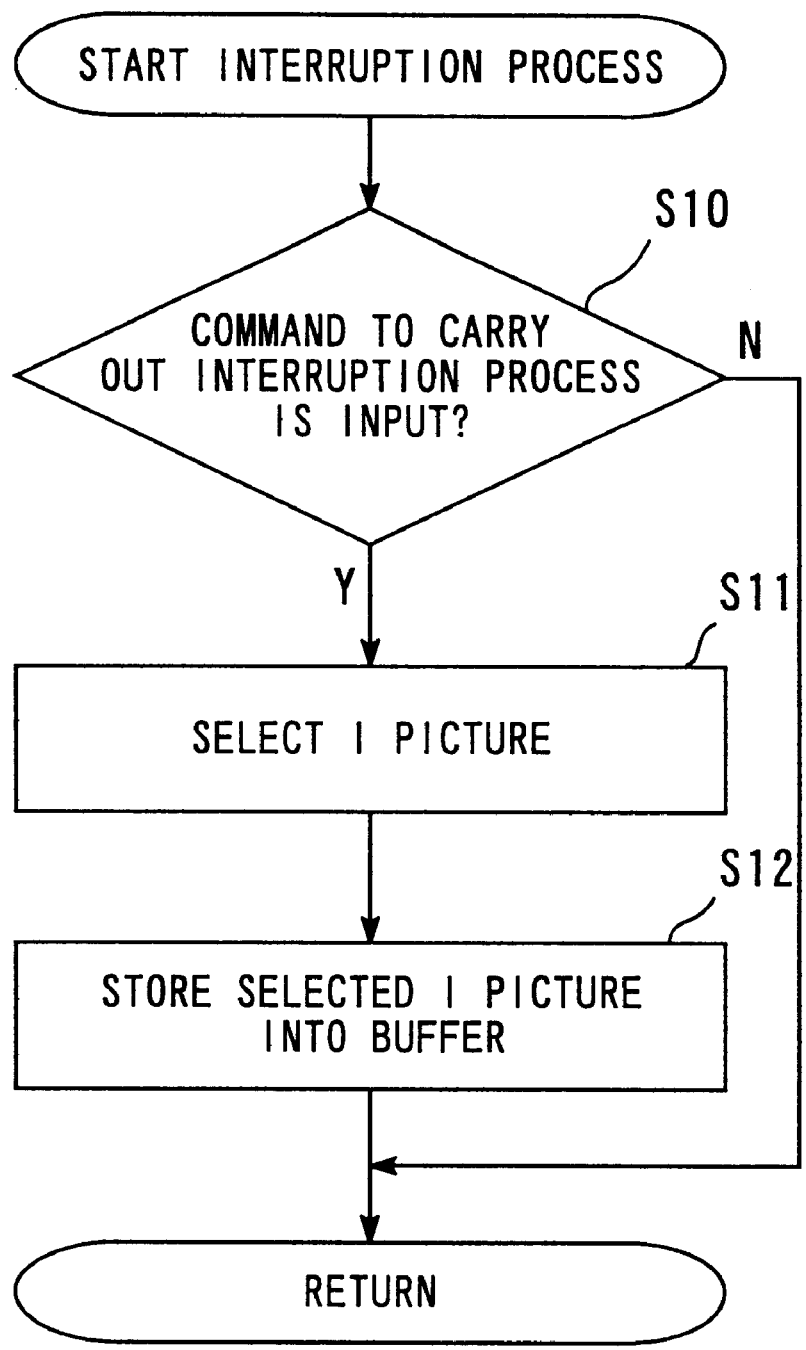
FIG. 4B is a flowchart showing an interruption process according to the first embodiment.

The interruption process shown in FIG. 4B is carried out, when the user inputs the command for carrying out the interruption process into the information recording and reproducing apparatus 100 by the screen selecting button 20a of the control portion 20. During the step 4 to the step 6 shown in FIG. 4A, the CPU 17 always monitors whether or not the command for carrying out the interruption process is input (step 10).

If the command for carrying out the interruption process is input, the main recording process is interrupted temporarily. And the I picture corresponding to the image input by the timing closest to the timing of the input command is selected from the digital signal Sd input into the MPEG encoder 4 (step 11).

The still image corresponding to the selected I picture is stored in the buffer 15 via the MPEG encoder 4, the multiplexer 10, the still image encoder 14, and the switch 21 (step 12). Then, the interruption process is ended and the main recording process is resumed.

At the time, when the a still image corresponding to another I picture was already stored in the buffer 15, it is substituted by the still image corresponding to the I picture selected by the interruption process.

If the step 6 of the main recording process is carried out after the interruption process was carried out, the still image corresponding to the I picture selected by the interruption process is recorded on the title domain of the optical disk 1.

Concretely, as mentioned above, the information recording and reproducing apparatus 100 records the image included in the information signal $S_{in}$ input from the external source on the optical disk 1 while reproducing (monitoring) it. In other words, the information recording and reproducing apparatus 100 records the program on the optical disk 1 while reproducing it. The user can search the image most appropriate for identifying the program while viewing the reproduced program image. When the user finds out the image most appropriate for identifying the program, the user inputs the command for implementing the interruption process into the information recording and reproducing apparatus 100 by the control portion 20. As a result, the still image found out by the user is recorded in the title domain of the optical disk 1. The recorded still image is displayed in the menu screen M as the scaled-down image for identifying the program in the next reproduction. Accordingly, the user can freely set or change the scaled-down image to be displayed on the menu screen M during the recording process.

In the main recording process, the I picture at the lead of the program is forcibly recorded in the title domain as the initial image. However, if the interruption process is carried out, the initial image is replaced by the image selected by the user.

The reproduction process of the information recording and reproducing apparatus 100 will be explained. The reproduction process explained below is carried out whenever one program recorded on the optical disk 1 is reproduced.

Figure 5A:
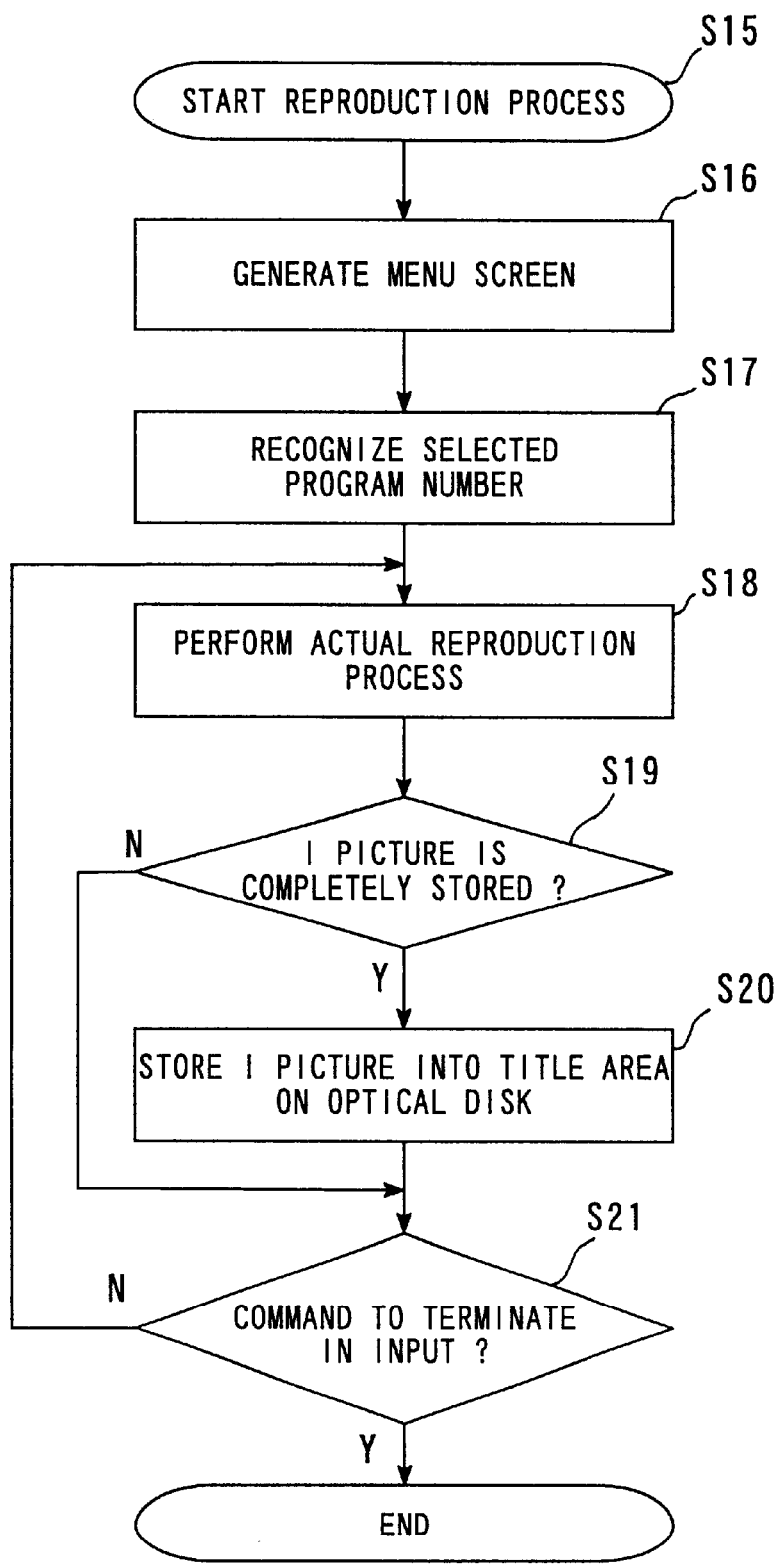
FIG. 5A is a flowchart showing a reproduction process according to the first embodiment.

As shown in FIG. 5A, when the main reproduction process is commenced (step 15), the I pictures (still images) corresponding to each program recorded on the title domain of the optical disk 1 are read out by the pickup 2. These I pictures are supplied to the menu screen producing circuit 12 via the reproducing circuit 8, the reproducing decoder 9, the multiplexer 10, and the MPEG decoder 11. The menu screen M is generated, using these I pictures in the menu screen producing part 12 (step 16). At the time, as shown in FIG. 1B, it is assumed that the I picture corresponding to the lead image of each program, that is, the initial image is recorded in each title domain $T_1$, $T_2$, $T_3$ . . . on the optical disk 1.

At this time, the switch 22 is switched to the menu screen producing circuit 12 side. Accordingly, the menu signal $S_{my}$ for forming the menu screen M is output to the monitor 200 via the D/A converter 13 as the switching signal $S_{ch}$. As a result, the menu screen M including the images $M_1$ to $M_6$ for identifying each program is displayed on the monitor 200 as shown in FIG. 1A.

When the menu screen M is displayed, the user selects a desired program while viewing the menu screen M. Concretely, the user inputs the command for selecting the program into the information recording and reproducing apparatus 100 by the control portion 20. The input command is recognized by the CPU 17 (step 17).

When the program is selected, the switch 22 is switched to the decode signal $S_{dc}$ side. The pickup 2 starts generating the detection signal $S_p$ corresponding to the program to be reproduced. Accordingly, the output signal Sout corresponding to the program to be reproduced is output to the outside (e.g., an output terminal of this apparatus which is connected with the output terminal of the D/A converter 13 and which is not depicted) via the reproducing circuit 8, the reproducing decoder 9, the multiplexer 10, the MPEG decoder 11, the switch 22 and the D/A converter 13 (step 18).

During the reproduction of the program, the above-mentioned interruption process (see FIG. 4B) can be carried out. That is, the user can input the command for carrying out the interruption process into the information recording and reproducing apparatus 100 by the control portion 20 so as to rewrite the image on the title domain of the optical disk 1, when the user finds out the image most appropriate for identifying the program while viewing the image of the reproduced program. As a result, the rewritten still image is displayed on the menu screen M as the still image for identifying the program in the next reproduction. Accordingly, the user can freely change the still image to be indicated on the menu screen M during the reproduction process.

Concretely, when the command for carrying out the interruption process is input so as to start the interruption process, the still image encoder 14 encodes the I picture reproduced by the timing closest to the timing of the input command, and stores this I picture in the buffer 15 as the switching signal $S_{be}$ via the switch 21.

Then, whether or not the I picture (still image) is completely stored in the buffer 15 is determined (step 19), and if not so, the process proceeds to the step 21.

On the other hand, if the I picture is completely stored in the buffer 15, the I picture stored in the buffer 15 is recorded in the title domain on the optical disk 1 corresponding to the program number of the program being reproduced then (step 20). Then, the interruption process is ended.

Whether or not the command for terminating the reproduction process is input is determined in the control portion 20 (step 21), and if it is input, the reproduction process is ended. On the other hand, if it is not input, the reproduction process is returned to the step 4 and maintained.

Figure 5B:
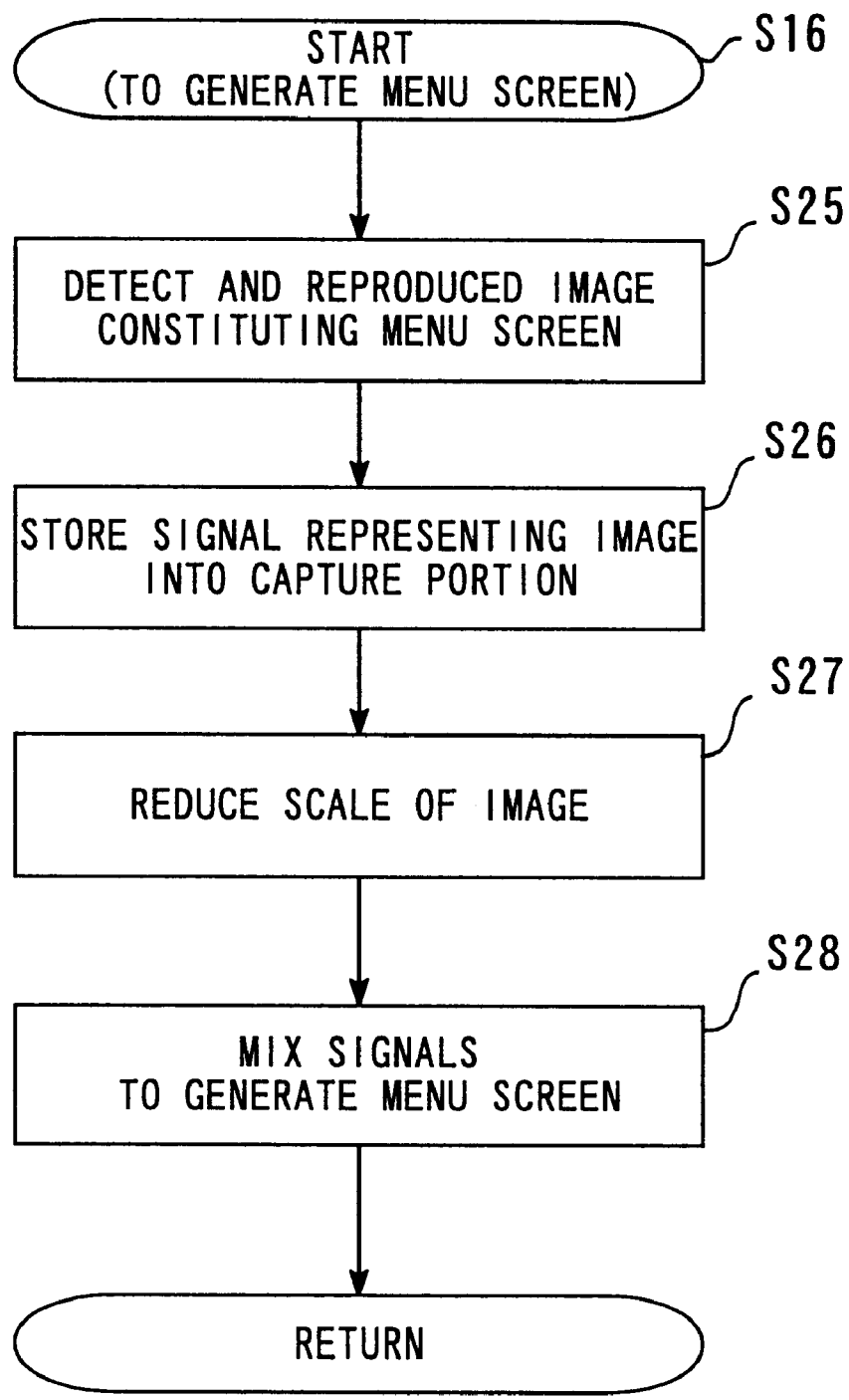
FIG. 5B is a flowchart showing a process of generating the menu screen according to the first embodiment.

The process of the step 16 will be explained in detail with reference to FIGS. 2 and 5B.

In the process of generating the menu screen M in the step 16, if the image (I picture) for constituting the menu screen M is detected and reproduced (step 25), the decode signal $S_{dc}$ corresponding to the reproduced image is input to the menu screen producing circuit 12 and firstly temporarily stored in the capture portion 23, and secondly output to the scale change portion 24 as the capture signal $S_{cp}$ (step 26).

Then, it is changed by the reduction scale necessary for constituting the menu screen M in the scale change portion 24 (step 27) and output to the mix portion 27 via the memory 25 as the reduction scale signal $S_{ex}$.

The mix portion 27 generates the menu screen M, using the above-mentioned reduction scale signal $S_{ex}$, image signal $S_g$ and decode signal $S_{dc}$, and outputs it to the switch 22 as the above-mentioned menu signal $S_{my}$ (step 28). Then, the process proceeds to the step 17.

Change of the menu screen M and change of the title domain when the process of the above-mentioned steps 18 to 20 is carried out are explained with reference to FIGS. 6A to 6C.

Figure 6A:
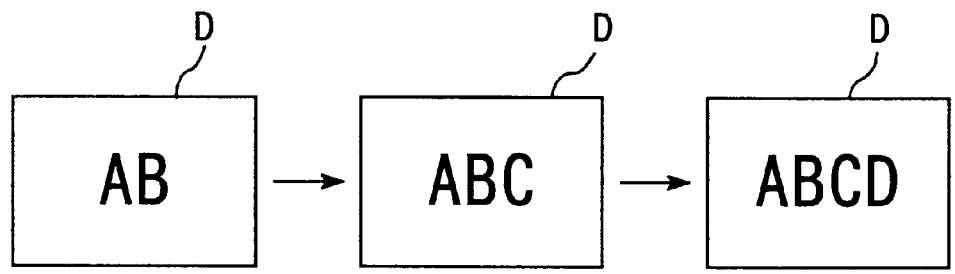
FIG. 6A is a diagram showing a change of an identification image.
Figure 6B:
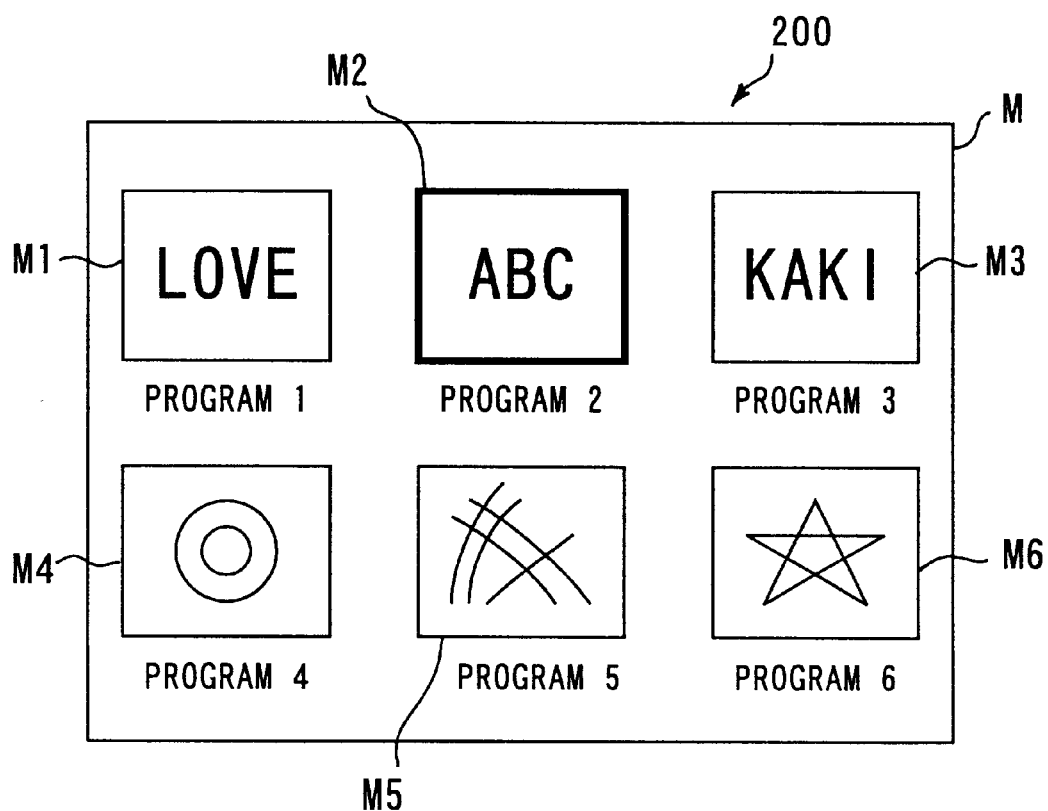
FIG. 6B is a diagram showing the menu screen of the first embodiment.

For example, it is assuming that, if the image at the center of the FIG. 6A (image representing the characters "ABC") is displayed on the monitor D while reproducing the program 2 as shown in FIG. 6A, the user selects this image as the image for identifying the program 2 and input the command for carrying out the interruption process into the information recording and reproducing apparatus 100 at this time. As a result, the I picture corresponding to this image is retrieved and selected (step 11), this I picture is stored in the buffer 15 (step 12), and this I picture in the buffer 15 is recorded in the title domain $T_2$ shown in FIG. 6C (step 20) so as to renew the title domain $T_2$. As a result, in the next reproduction of the programs recorded on the optical disk 1, as shown in FIG. 6B, the renewed image $M_2$ is displayed in the monitor screen M as the image for identifying the program 2.

As heretofore explained, according to the information recording and reproducing apparatus 100 of the first embodiment, the scaled-down image to be displayed on the menu screen can be changed to an image appropriate for identifying each program. Furthermore, the user can select the image appropriate for identifying the program while viewing the reproduced program in recording the program on the optical disk 1 or in reproducing the program recorded on the optical disk 1. As a result, the menu screen can be formed as the user like.

(II) Second Embodiment

A second embodiment of the present invention will be described. Although the still image for identifying each program is recorded in the title domain of the optical disk 1 in the above-mentioned first embodiment, the address indicating the still image for identifying each program is recorded in the title domain in the second embodiment. The still image for identifying the program is either the still image at the lead of the program or the still image selected by the user. This means that a still image for identifying the program always exists in the program. Therefore, the position where the still image for identifying the program exists in the program, that is, the address can be specified. For example, the address is an address on the optical disk 1.

The configuration of the information recording and reproducing apparatus according to this embodiment is the same as that of the information recording and reproducing apparatus 100 according to the first embodiment except that the switch 21 is switched to the address information signal $S_{add}$ side.

Furthermore, like the information recording and reproducing apparatus 100 according to the first embodiment, the information recording and reproducing apparatus according to this embodiment carries out the main recording process, the interruption process, and the reproduction process. The principal part of the main recording process, the interruption process, and the reproduction process according to this embodiment is basically the same as that of the first embodiment. However, the I picture itself is not recorded on the title domain of the optical disk 1 in the main recording process, the interruption process and the reproduction process of this embodiment, but the address on the optical disk 1 where the I picture is positioned is recorded in the title domain.

Figure 7A:
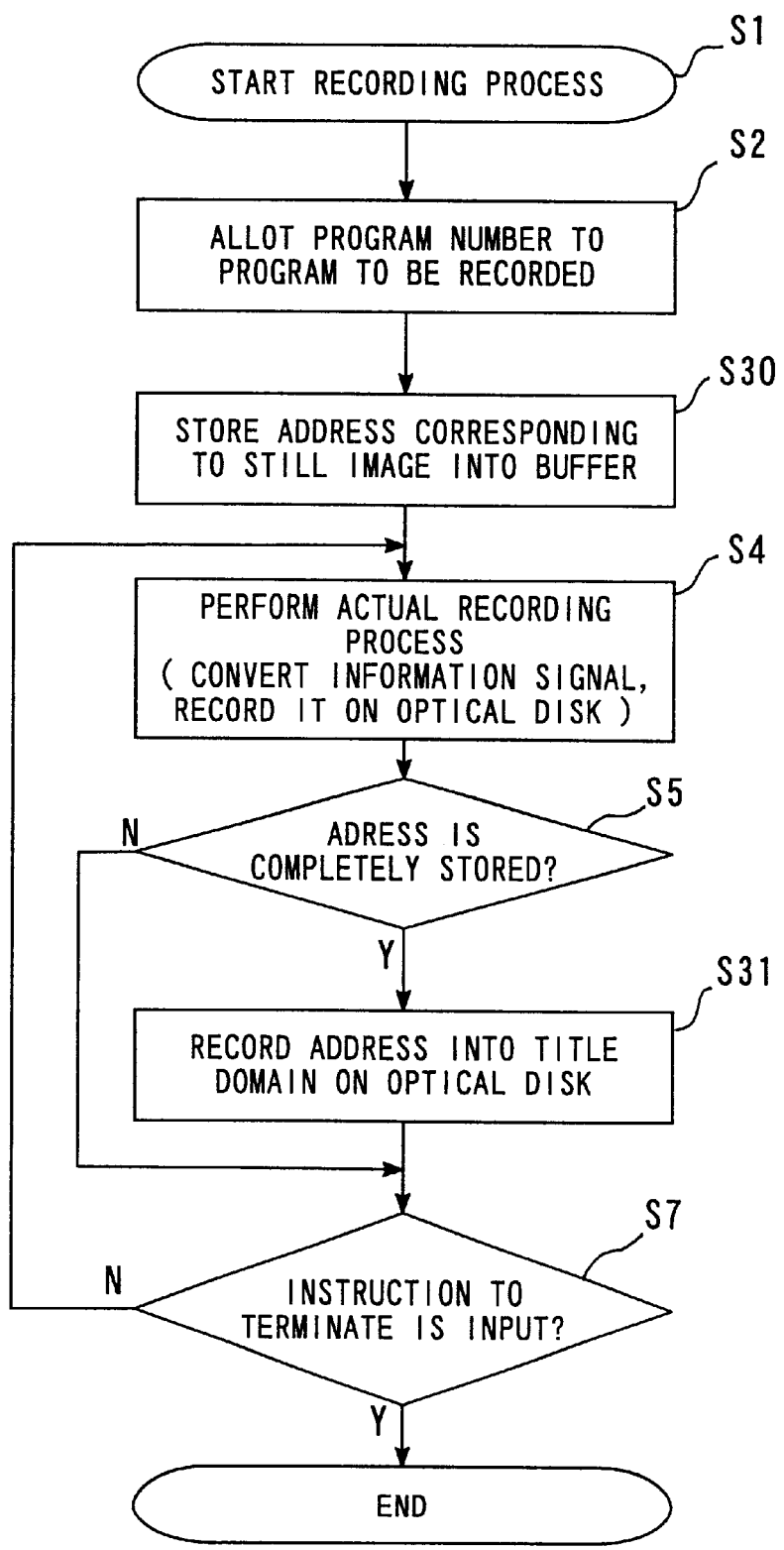
FIG. 7A is a flowchart showing a recording process according to a second embodiment of the present invention.
Figure 7B:
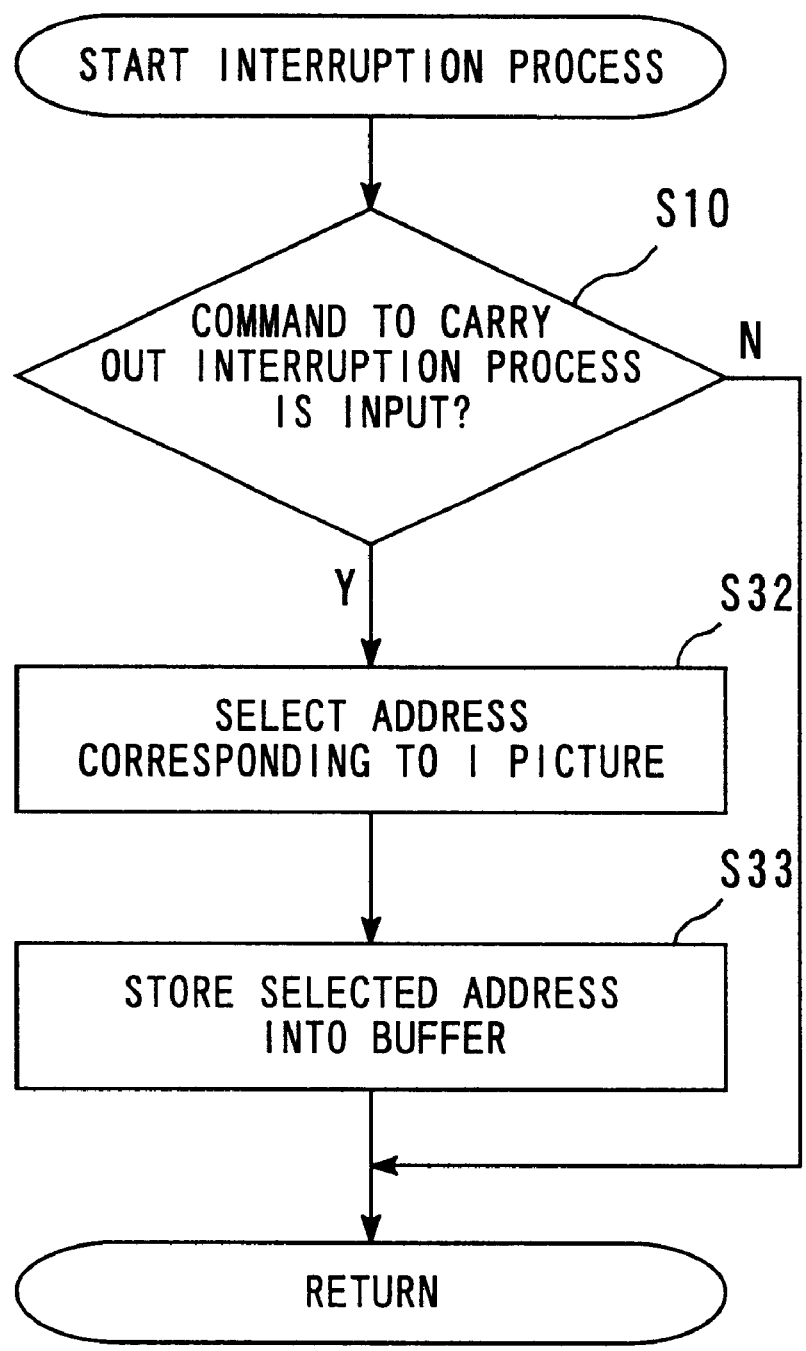
FIG. 7B is a flowchart showing an interruption process according to the second embodiment.

Hereinafter the main recording process, the interruption process and the reproduction process will be explained with reference to FIGS. 7A, 7B and 8. In FIGS. 7A, 7B and 8, the same steps as those shown in FIGS. 4A, 4B and 5A are applied with the same reference numbers.

Firstly, the main recording process according to the second embodiment will be explained with reference to FIG. 7A. Since the title domain of the optical disk 1 according to the second embodiment is for recording the address, it has an area smaller than that of the title domain of the optical disk 1 according to the first embodiment.

When the main recording process is commenced (step 1), a program number is allotted to the information (i.e., program) to be recorded on the optical disk 1, and the title domain for recording the address information is formed (allocated) on the optical disk 1 (step 2).

Then, input of the information signal $S_{in}$ corresponding to the program is started. Then, the address information showing the recording position of the I picture corresponding to the lead image of the program on the optical disk 1 is output from the recording encoder 6 as the recording address signal $S_{ra}$ so as to be temporarily stored in the buffer 15 via the CPU 17 and the switch 21 (step 30).

At the same time, the information signal $S_{in}$ is converted to the recording signal $S_r$ so as to be recorded on the optical disk 1 successively (step 4).

When the address showing the recording position of the I picture is completely stored in the buffer 15 (step 5), the address is recorded in the title domain corresponding to the program number given in the step 2 (step 31). In this case, the address is recorded in the corresponding title domain as the buffer signal $S_{bo}$ by the pickup 2 via the multiplexer 5, the recording encoder 6 and the recording circuit 7 as in the first embodiment.

Then, whether or not the command for terminating the recording operation is input is determined in the control portion 20 (step 7), and if so, the main recording process is terminated. On the other hand, if not so, the main recording process returns to the step 4.

The interruption process will be explained with reference to FIG. 7B. The interruption process can be carried out only from the step 4 to the step 31 in the main recording process shown in FIG. 7A.

The interruption process is carried out by the operation of the screen selecting button 20a of the control portion 20. The CPU 17 always monitors whether or not the screen selecting button 20a is operated from the step 4 to the step 31 shown in FIG. 7A (step 10).

If the screen selecting button 20a of the control portion 20 is operated and the command for carrying out the interruption process is input, the address showing the I picture corresponding to the image input at the timing closest to the timing of the input command is retrieved and selected from the digital signal $S_d$ input in the MPEG encoder 4 (step 32).

The selected address is stored in the buffer 15 as the switching signal $S_{be}$ via the CPU 17 and the switch 21 (step 33). Accordingly, the interruption process is terminated and the process returns to the main recording process. At this time, if the address corresponding to another I picture was already stored in the buffer 15, it is substituted by the above-mentioned selected address.

By carrying out the process of the above-mentioned step 31 after implementing the interruption process, the selected address representing the image desired by the user is recorded in the title domain on the optical disk 1 as the address representing the image for identifying the program.

The reproduction process according to this embodiment will be explained with reference to FIG. 8.

As shown in FIG. 8, when the reproduction process is commenced (step 15), the addresses showing the I pictures corresponding to each program recorded in the title domain on the optical disk 1 are read out, and the I pictures corresponding to the addresses are read out from the optical disk 1. Then, the menu screen M is generated, using the I pictures (step 34). Then, the menu screen M is output to the monitor 200.

Then, the user operates the control portion 20 while viewing the menu screen M so as to select the program to be reproduced. Accordingly, the pickup 2 starts the generation of the detection signal $S_p$ corresponding to the selected program so that the reproduction of the program is carried out by the reproducing circuit 8, the reproducing decoder 9, the multiplexer 10, the MPEG decoder 11, the switch 22 and the D/A converter 13, and the other devices (step 18).

During the reproduction of the program, the address showing the recording position of each I picture in the reproduced program is output to the CPU 17 as the reproduction address signal $S_{pa}$. If the user inputs the command for implementing the interruption process into the information recording and reproducing apparatus by the control portion 20 during the reproduction of the program, the interruption process is started. The reproduction address signal $S_{pa}$ corresponding to the I picture reproduced at the timing closest to the timing of the input command is successively stored in the buffer 15 as the switching signal $S_{be}$ via the switch 21. Then, when the address (switching signal $S_{be}$) is completely stored in the buffer 15 (step 35), the address is recorded in the title domain of the optical disk 1 corresponding to the program number of the selected program (step 36). Then, the interruption process is ended.

Whether or not the command for terminating the reproduction operation is input is determined in the control portion 20 (step 21). If it is input, the reproduction process is terminated. On the other hand, if it is not input, the reproduction process returns to the step 18.

As heretofore explained, according to the information recording and reproducing apparatus of the second embodiment, the image appropriate for identifying each program can be selected as the image to be displayed on the menu screen. Moreover, the user can select the image appropriate for identifying the program while viewing the reproduced program in recording the program on the optical disk or in reproducing the program recorded on the optical disk. As a result, the menu screen can be formed as the user like.

Furthermore, according to the information recording and reproducing apparatus of the second embodiment, since only the address is recorded on the optical disk 1, the area of the title domain can be smaller and thus the recordable domain on the optical disk 1 can be enlarged. As a result, a larger number of programs can be recorded on the optical disk 1.

Although the case where the present invention is adopted in an information recording and reproducing apparatus capable of both recording and reproducing information on the optical disk 1 has been explained in the above-mentioned embodiments, the present invention can also be adopted in an information reproducing apparatus capable of only reproducing a program excluding the A/D converter 3 and the MPEG encoder 4 from the information recording and reproducing apparatus 100 shown in FIG. 2 or an information recording apparatus capable of only recording a program excluding the menu screen producing circuit 12, the switch 22 and the D/A converter 13 from the information recording and reproducing apparatus 100 shown in FIG. 2.

Moreover, although the case where an optical disk 1 is used as the recording medium has been explained in the above-mentioned embodiments, the present invention can be adopted to, for example, a semiconductor memory, and the like as long as it is a recording medium capable of recording information and so-called random access.

Further, although the case where the MPEG 2 method is used as the compression process has been explained in the above-mentioned embodiments, the present invention can be adopted to other compression processes.

Furthermore, the present invention can be adopted to an information recording and reproducing apparatus where the information to be recorded is processed for recording and recorded regardless of the above-mentioned compression process.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-010856 filed on Jan. 22, 1998 including the specification, claims, drawings and summary is incorporated herein by reference in its entirety.

What is claimed is:

1. An apparatus for recording information including a plurality of information groups onto a recording medium, each of the plurality of information groups including a plurality of images, the apparatus comprising:

a first recording device for recording the plurality of images onto the recording medium for each of the plurality of information groups;

a reproduction device for reproducing the plurality of images for each of the plurality of the information groups, while the first recording device is recording the plurality of images onto the recording medium;

a selection device for selecting one image from the plurality of images reproduced by the reproduction device as an identification image for identifying one of the plurality of information group in which the selected one image is included, while the first recording device is recording the plurality of images onto the recording medium; and a second recording device for recording at least either one of the identification image and information designating the identification image onto the recording medium.

2. The apparatus according to claim 1, wherein the first recording device records the plurality of images into a recording domain formed on the recording medium, the second recording device records at least either one of the identification image and the information designating the identification image into an identification domain formed on the recording medium, and the identification domain is separated from the recording domain.

3. The apparatus according to claim 1, wherein the selection device comprises:

an accepting device for accepting an input of an instruction; and an image selecting device for selecting one image that is reproduced at a time closest to a time that the accepting device accepts the input of the instruction.

4. An apparatus for reproducing information including a plurality of information groups from a recording medium on which the information is recorded, each of the plurality of information groups including a plurality of images, the apparatus comprising:

a reproduction device for reproducing the plurality of image from the recording medium for each of the plurality of information groups;

a selection device for selecting one image from the plurality of images reproduced by the reproduction device as an identification image for identifying one of the plurality of information group in which the selected one image is included, while the reproduction device is reproducing the plurality of images from the recording medium;

a recording device for recording at least either one of the identification image and information designating the identification image onto the recording medium; and a menu screen producing device for producing and displaying a menu screen including the identifying image recorded on the recording medium by the recording device.

5. The apparatus according to claim 4, wherein the reproduction device reproduces the plurality of images from a recording domain formed on the recording medium, the recording device records at least either one of the identification image and the information designating the identification image into an identification domain formed on the recording medium, and the identification domain is separated from the recording domain.

6. The apparatus according to claim 4, wherein the selection device comprises:
   an accepting device for accepting an input of an instruction; and
   an image selecting device for selecting one image that is reproduced at a time closest to a time that the accepting device accepts the input of the instruction.

7. The apparatus according to claim 4, wherein the menu screen producing device produces and displays the menu screen on which the identification images respectively identifying the plurality of information groups are arranged.

8. The apparatus according to claim 7 further comprising an identification image selection device for selecting one identification image from the identification images arranged in the menu screen,
   wherein the reproduction device reproduces the plurality of images included in one of the plurality of information groups that is identified by the selected one identification image.

* * * * *